March 26, 1968
L. I. TILLERY
3,374,813
FORTABLE SAWMILL APPARATUS
Filed Feb. 7, 1966
4 Sheets-Sheet 1
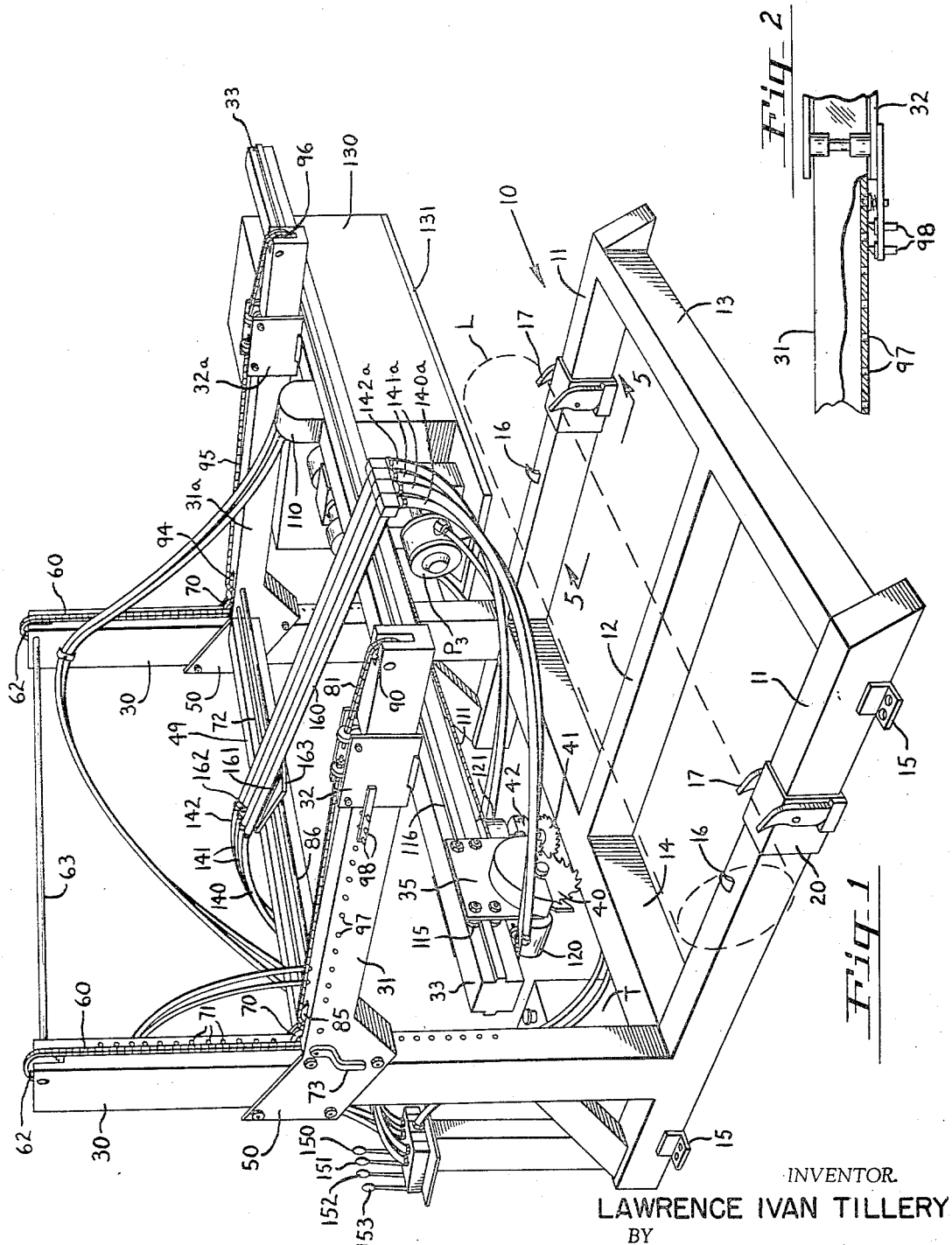
INVENTOR.
LAWRENCE IVAN TILLERY
BY
*[signature]*
Attorney March 26, 1968 — L. I. TILLERY — 3,374,813
PORTABLE SAWMILL APPARATUS
Filed Feb. 7, 1966 — 4 Sheets-Sheet 2
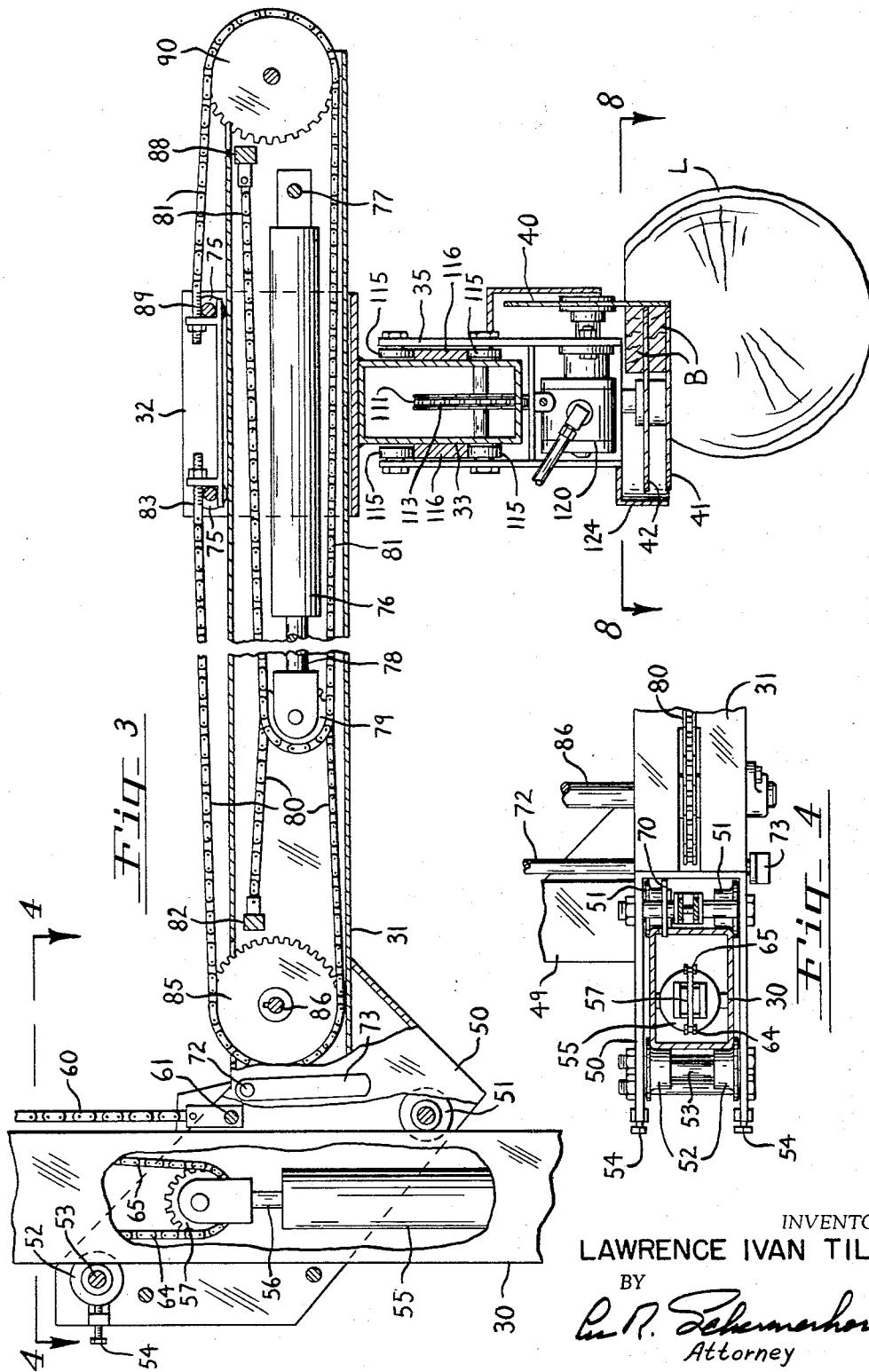
INVENTOR.
LAWRENCE IVAN TILLERY
BY
*Attorney*

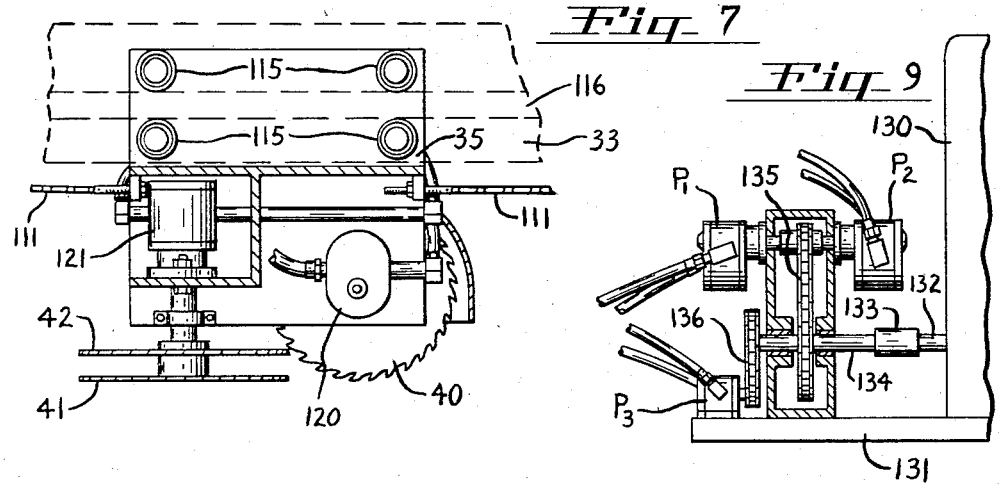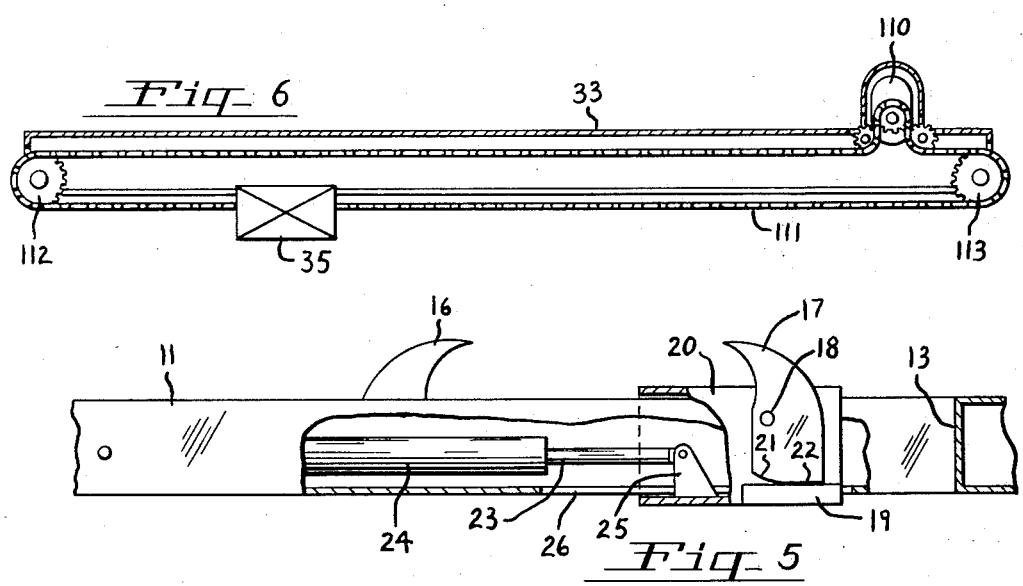

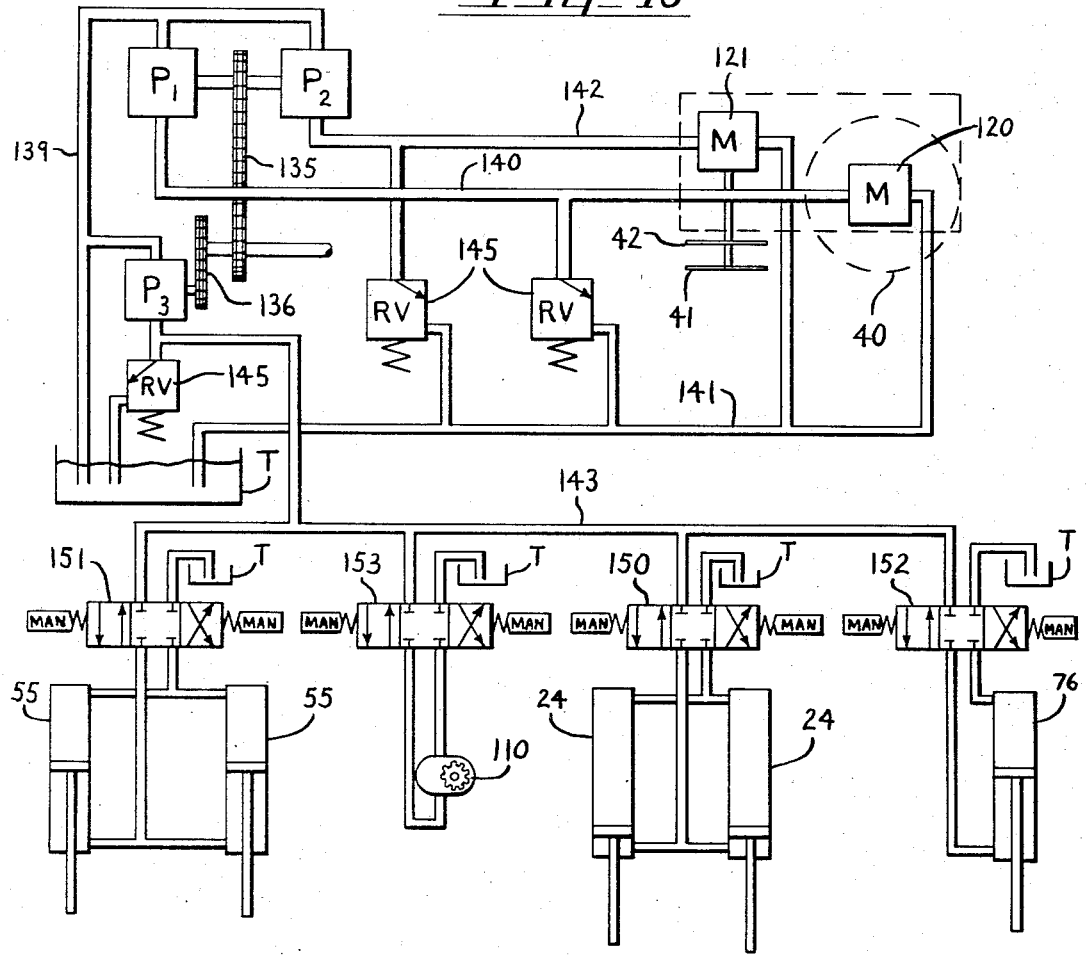
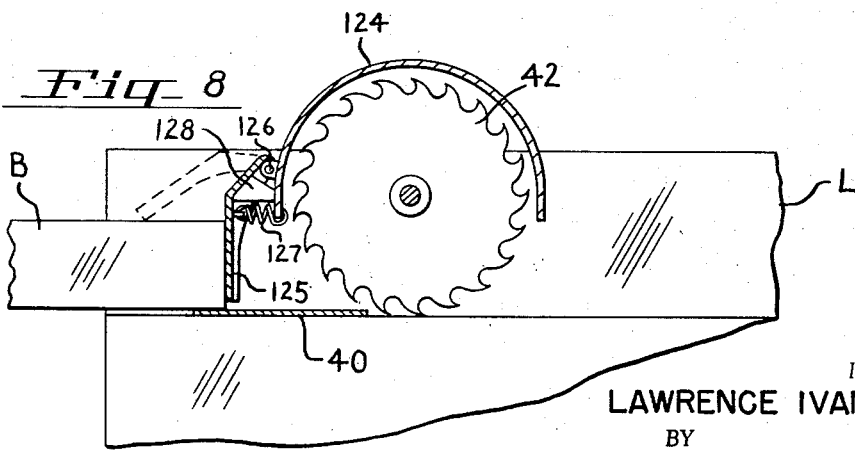

United States Patent Office 3,374,813
Patented Mar. 26, 1968

3,374,813
PORTABLE SAWMILL APPARATUS
Lawrence Ivan Tillery, 1201 Cedar St.,
La Grande, Oreg. 97851
Filed Feb. 7, 1966, Ser. No. 525,451
12 Claims. (Cl. 143—38)

This invention relates to portable sawmill apparatus for sawing logs into lumber.

Portable sawmill apparatus has great utility, especially in salvaging the usable portions of partially rotten or defective logs. Where only a part of a log is usable, it is uneconomical to transport the log to a sawmill at a great distance for the small amount of lumber it will yield. Much timber has been wasted in the past because only the good and sound logs were transported to the sawmill while the rest were abandoned or destroyed at the site of the logging operation. The reason for this has been the lack of a practical and efficient portable sawmill which could be transported conveniently and operated efficiently on the site of the logging operation. With such means available all of the sound portions of the logs may be utilized and only the rotten or defective portions left behind. Portable sawmill apparatus heretofore proposed has been too heavy to be conveniently portable and has been generally too inefficient to win acceptance in the industry.

The general object of the present invention is, therefore, to provide improved portable sawmill apparatus which is light in weight and efficient in operation. Other objects are to provide apparatus of the type described powered by hydraulic motors, to provide a separate portable power plant for operating the sawmill and to provide apparatus which is relatively inexpensive to build and operate but which is rugged and durable in operation.

The present apparatus is contained on a frame which may be transported by pickup truck or equipped with skids for dragging it through the woods. The saws and other power-operated instrumentalities are driven by compact and lightweight hydraulic motors so that a heavy frame and saw carriage do not have to be provided for supporting and reciprocating a prime mover. Pumps to furnish the necessary hydraulic pressure may be driven by a separate portable engine or by a power take-off from a tractor. This makes it possible to follow behind the logging operation so that the logs need to be moved only a relatively short distance from where the trees fall to the sawmill. Expensive long distance trucking of logs with all the accompanying bark and waste material is eliminated and only the usable lumber itself is hauled away. This method of operation effects a considerable economy even in operations where the timber is relatively sound and in good condition.

Additional objects and advantages will become apparent and the invention will be better understood from the following description of the preferred embodiment illustrated in the accompanying drawing. Various changes may be made in the details of construction and arrangement of parts and certain features may be used without others. All such modifications within the scope of the appended claims are included in the invention.

In the drawings:

FIGURE 1 is a perspective view of a portable sawmill apparatus embodying the principles of the invention;

FIGURE 2 is a fragmentary top plan view of one of the horizontal arms in FIGURE 1, with parts broken away, showing the horizontal set means for the slide which shifts the saw carriage track bar;

FIGURE 3 is a fragmentary end elevation view of the sawmill with parts broken away and parts in section;

FIGURE 4 is a view on the line 4—4 in FIGURE 3;

FIGURE 5 is a view on the line 5—5 in FIGURE 1, with parts broken away, showing one of the dog-actuating mechanisms for holding a log on the base frame of the sawmill;

FIGURE 6 is a vertical sectional view of the saw carriage track bar;

FIGURE 7 is a rear elevation view of the saw carriage with parts broken away;

FIGURE 8 is a view on the line 8—8 in FIGURE 3 showing the action of the board ejector plate;

FIGURE 9 is an elevation view of the pump unit with parts broken away; and

FIGURE 10 is a schematic diagram of the hydraulic system.

*General description*

Referring first to FIGURE 1, the apparatus is mounted on a base frame 10 having a pair of hollow end members 11 and a center member 12 extending transversely under the log L. These three members are connected at their outer ends by a longitudinal member 13 and are connected at a short distance from their opposite ends by a longitudinal member 14. Brackets 15 are provided on the members 11 for mounting the base frame on a pair of skids, if desired.

Base members 11 are also equipped with fixed dogs 16 and movable dogs 17 for holding the log. Each dog 17 comprises a pair of pointed plates pivotally mounted on a pin 18 in a slide 20 as shown in FIGURE 5. The lower rear corners of the dog plates are rounded at 21 to permit them to rotate down out of the way when a log rolls over them. After the log has moved clear of the dog plates, they swing back up to upright position by gravity, the lower forward corners of the dog plates having stop portions 22 which seat on flange portions 19 on the slide so that the dog plates cannot rotate backward. The slide is reciprocated on member 11 by a piston rod 23 in cylinder 24 contained within member 11. The piston rod is connected to a lug 25 on the slide which travels in slot 26 in the bottom wall of member 11.

Referring back to FIGURE 1, a pair of hollow uprights 30 are mounted on end members 11 in the vertical plane of member 14. A pair of hollow horizontal arms 31 and 31a are mounted for raising and lowering movements on the uprights 30, these arms extending out over the base frame 10 above the log L. Mounted on these arms are a pair of slides 32 and 32a which support a hollow track bar 33 for the saw carriage 35.

Mounted on saw carriage 35 is a vertical saw 40 and a pair of horizontal saws 41 and 42 as shown in FIGURE 3. In a sawing operation the carriage 35 travels from left to right in FIGURE 1. During the travel of the carriage in a sawing operation, the three saws saw two boards B as will be apparent in FIGURE 3. Vertical saw 40 saws one edge of both boards, lower saw 41 operates on the bottom surface of the bottom board and upper saw 42 forms a horizontal kerf between the two boards. The carriage is equipped with means for sliding the sawed boards lengthwise out of the log during its return movement with the saws returning in the same path of travel.

When the carriage has returned beyond the left end of the log in FIGURE 1 and has discharged the two boards, the slides 32 are moved outward on arms 31 by hydraulic motor means the proper distance to cut two more boards in the next sawing operation. FIGURE 3 shows the second cut in progress at an intermediate level in the log. One more cut will be made at this level and then slides 32 and 32a are moved inward on arms 31 and 31a and the arms are lowered on uprights 30 a distance equal to the thickness of two boards plus the widths of the horizontal kerfs cut by the two horizontal saws.

All of the movements and operations are powered by hydraulic motor means. Arms 31 and 31a are raised and lowered by hydraulic cylinders, slides 32 and 32a are shifted by a hydraulic cylinder, carriage 35 is driven by a reversible rotary hydraulic motor and the saws are driven by rotary hydraulic motors.

Hydraulic motors have the advantage of being small in size and light in weight for the amount of power developed whereby the structural parts of the apparatus are not required to be as heavy and massive as they would need to be for supporting and reciprocating electric motors or an internal combustion engine with its fuel tank. In the present apparatus, the source of power which is an internal combustion engine and pump unit is removed from the saw carriage so that the carriage is required to support only the saws and their lightweight hydraulic driving motors.

*Details of construction*

The inner end of each horizontal arm 31 and 31a is rigidly connected with a U-shaped supporting guide member 50 which straddles opposite sides of an upright 30 as shown in FIGURES 3 and 4. The two guide members 50 are interconnected by a horizontal beam 49. Each guide member 50 has a pair of lower flanged rollers 51 to ride on the front side of the upright and a pair of upper flanged rollers 52 to ride on the rear side of the upright. Upper roller shaft 53 is adjustable horizontally toward and away from upright 30 by means of screws 54 to level the arm 31.

Arms 31 and 31a are raised and lowered in unison by a pair of double acting hydraulic cylinders 55, one in each upright 30. The lower end of each cylinder 55 is anchored in the upright 30 and a piston rod 56 extends out of the upper end carrying a sprocket wheel 57. Vertical movement of piston rods 56 is transmitted to arms 31 and 31a by a chain 60 which has a lower outer end connected to guide member 50 at 61. The chains 60 are trained over sprocket wheels 62 keyed to the opopsite ends of a shaft 63 as shown in FIGURE 1. Shaft 63 is mounted for rotation in bearings in the upper ends of uprights 30. Each chain 60 passes down inside the upright 30 in a vertical reach 64 to sprocket wheel 57 and thence upward in a vertical reach 65 to an upper end which is secured inside of the upright. When the two piston rods 56 are retracted into cylinders 55, the arms 31 and 31a are lifted and, when the piston rods are extended, the arms descend by gravity. Upper sprocket wheels 62 on the common shaft 63 prevent one arm from moving up or down more than the other so that the two arms are always on the same level.

Arms 31 and 31a are locked in adjusted vertical position by a pair of dogs or pins 70 which are arranged to enter spaced vertical set stop holes 71 in the uprights 30. The dogs are mounted on opposite ends of a shaft 72 which may be rotated by a handle 73 on the left end in FIGURE 1 to engage and disengage the dogs from the holes. The two dogs 70 thereby lock the two arms 31 and 31a individually.

Slides 32 and 32a are U-shaped to straddle the arms 31 and 31a, the upper ends of the legs of the U having rollers 75 to roll on the upper surfaces of the arms. The two slides are reciprocated in unison by a single double acting hydraulic cylinder 76 in arm 31 as shown in FIGURE 3. The outer end of the cylinder is anchored in the arm at 77 and a piston rod 78 extends out of the inner end of the cylinder. Piston rod 78 carries a pair of sprocket wheels 79 for the chains 80 and 81.

Chain 80 has an inner end anchored to the arm at 82 and an outer end anchored to slide 32 at 83. This chain is trained around one of the sprocket wheels 79 and also a sprocket wheel 85 keyed on a shaft 86 which is mounted for rotation in bearings at the inner ends of the arms 31 and 31a. Chain 81 has an inner end anchored to the arm 31 at 88 and an outer end anchored to slide 32 at 89. This chain is trained around a sprocket wheel 90 on the outer end of the arm. When piston rod 78 is extended, chain 81 is pulled into the outer end of the arm and chain 80 is paid out from the inner end of the arm to move slide 32 outward on the arm. When piston rod 78 is retracted, the movements of the two chains are reversed to move slide 32 inward on the arm.

Shaft 86 drives a sprocket wheel 94 in the inner end of the arm 31a to drive a chain 95 on that arm. Chain 95 is trained around sprocket 94 at the inner end of the arm and a sprocket 96 at the outer end of the arm and has its ends connected to slide 32a whereby this slide is moved in unison with slide 32.

Arm 31 is provided with a series of horizontal set stop holes 97 and slide 32 is provided with a series of spring-loaded stop pins 98 to enter the holes and index slide 32 to different operating positions along the arm 31. The pins 98 are spaced differently from the holes 97 so that only one pin 98 will enter a hole 97 in one position of the slide. When the hole-engaging pin is manually retracted and the slide 32 is moved outward on the arm, another pin 98 will snap into another hole 97 when the slide has moved a distance equal to a board width. The rear sides of the inner ends of pins 98 are bevelled so that the pins will not stop the movement of the slide toward uprights 30. Slide 32a may be similarly equipped.

The carriage drive mechanism on track bar 33 is illustrated in FIGURE 6, the saw carriage 35 being shown diagrammatically. Rotary hydraulic motor 110 drives endless chain 111 around sprocket wheels 112, 113 on opposite ends of the track bar. Saw carriage 35 is connected with the lower reach of the chain. As shown in FIGURE 3, the saw carriage is equipped with eight rollers 115 to ride on a pair of track rails 116 on opposite sides of the track bar 33. The track bar extends beyond opposite ends of the log.

As shown in FIGURE 7, the saw carriage 35 supports a first rotary hydraulic motor 120 for driving the vertical saw 40 and a second rotary hydraulic motor 121 for driving the two horizontal saws 41 and 42 on a common shaft. As shown in FIGURE 8, the horizontal saws 41, 42 are partially enclosed by a guard 124 which carries a board ejector 125. Board ejector 125 is a plate which is pivotally mounted at 126 on the guard 124 and equipped with a spring 127 which urges the ejector toward its solid line position. This position is determined by a stop member 128 on the ejector which engages the tail of guard 124.

In sawing the pair of boards B from the log L, the saw carriage moves from left to right in FIGURE 8 causing ejector plate 125 to swing out to its broken line position and ride on the edges of the newly sawed boards. As the saw carriage moves beyond the right end of the log, the ejector plate springs back to its solid line position and then as the saw carriage moves back toward the left, the ejector plate engages the ends of the sawed boards and slides them lengthwise from the log as shown. Guard 124 and ejector plate 125 are omitted in FIGURE 7.

*Hydraulic system*

FIGURE 9 illustrates the pumping unit for driving the hydraulic motors and cylinders previously described. This unit comprises three gear type pumps $P_1$, $P_2$ and $P_3$, which are mounted on a common base 131 with an internal combustion engine 130. Engine shaft 132 is connected through flexible coupling 133 to a main pump drive shaft 134. This drive shaft and the pump shafts are equipped with sprocket wheels whereby the pumps $P_1$ and $P_2$ are driven by a chain 135 and the pump $P_3$ is driven by a chain 136.

In the illustrated embodiment, the motor base 131 which carries the pumping unit is preferably mounted on skids, not shown, so that it can be dragged on the ground or unloaded from a truck for convenient portability. The pumping unit may also be mounted on the base frame 10 of the sawmill, if desired, and driven by a shaft from a portable internal combustion engine or by suitable shafting from the power take-off of a tractor. In any event, it is preferred to keep the engine separate from the sawmill apparatus for convenience in moving the sawmill from place to place. It is easier to move the sawmill and the engine separately and establish the necessary connections either by hydraulic lines or shafting after the sawmill has been set up in a desired location. The pumping unit being relatively small and light in weight may thus be mounted either on the sawmill base or the engine base as desired.

The hydraulic system is illustrated schematically in FIGURE 10. The three pumps $P_1$, $P_2$ and $P_3$ are supplied with hydraulic fluid through conduit 139 from a reservoir tank T. Pump $P_1$ discharges into a pressure line 140 for the vertical saw motor 120 which discharges into a discharge conduit 141 communicating with tank T. Pump $P_2$ discharges into a pressure line 142 for the horizontal saw motor 121. Pump $P_3$ discharges into a pressure line 143 which supplies cylinders 24, 55 and 76 and rotary hydraulic motor 110. The three pressure lines 140, 142 and 143 are connected with pressure relief valves 145 which maintain a predetermined operating pressure in the pressure lines. The pumps have excess capacity for delivering hydraulic fluid to the various hydraulic motors and cylinders and the pressure relief valves permit the excess flows to return to the tank T.

Log dog cylinders 24 are arranged to be actuated, locked and retracted by a three position manual valve 150. Vertical lift cylinders 55 are arranged to be raised, lowered and locked by a three position manual valve 151. Horizontal arm cylinder 76 is arranged to be actuated, retracted and locked by a three position manual valve 152. Rotary hydraulic motor 110 is arranged to be actuated in opposite directions and locked by a three position manual valve 153. In order to simplify the diagram, these valves are shown connected with four separate tanks T but it is to be understood that in practice the discharge lines from these valves all lead to the main tank T which supplies the pump input conduit 139.

The valves 150 to 153 are mounted in a convenient position for the operator as shown in FIGURE 1. The saw motors 120 and 121 run continuously as long as the pump unit is operating. The pump drive shaft is started and stopped by a clutch, not shown, in engine 130. When it is desired to stop the saws, the clutch is disengaged, deenergizing the whole hydraulic system.

In order to accommodate the travel of saw carriage 35 on track bar 33 the hydraulic lines for the saw motors include a pipe boom 160 as shown in FIGURE 1. This boom comprises four rigid metal pipes welded at one end to a bearing plate 161 which is pivotally mounted on a vertical kingpin 162 on the horizontal beam 49. Bearing plate 161 is supported for pivotal sliding movement on an arcuate supporting plate 163 welded onto the beam 49.

Two of the pipes in the boom 160 are connected to the pressure lines 140 and 142 and the other two pipes are connected to a pair of discharge lines 141, although for convenience of illustration FIGURE 10 shows only one such discharge line. The outer ends of the boom pipes are connected to flexible pressure hoses 140a and 142a and flexible discharge hoses 141a, all of which connect with the saw motors 120 and 121. Boom 160 follows the movements of the saw carriage along track bar 33 and the flexible hoses have sufficient length to accommodate the movements of slides 32 and 32a toward and away from uprights 30. Other pairs of flexible hoses connect hydraulic motor 110 and the various hydraulic cylinders with the manual valves 150 to 153 as shown. Still other flexible hoses connect the valves with the pump unit and tank essentially as shown in FIGURES 1 and 10.

Operation

The operation of the sawmill is relatively simple. First, a log is locked in position on base frame 10 by manipulation of valve 150 with the arms 31, 31a raised sufficiently to provide the necessary clearance for rolling the log onto the base frame 10. Saw carriage 35 remains at the left end of track bar 33 in FIGURE 1 after ejecting the boards from its last cut. Arms 31, 31a are then lowered to a selected level for making the first cut by manipulation of valve 151 and slides 32, 32a are shifted into position for the first cut by manipulation of valve 152 and these positions are mechanically locked by the locking pins 70 and 98. Saw carriage 35 is then traversed to the right in FIGURE 1 on track bar 33 by manipulation of valve 153, causing two boards to be cut from the log. When the saw carriage is returned to the left, ejector plate 125 in FIGURE 8 removes the two boards and carries the saws beyond the left end of the log. Slides 32, 32a are then moved out one board width on the arms 31, 31a and when the saw carriage is again traversed to the right on track bar 33, two more boards are cut from the log.

After the top of the log has been made flat by one or more cuts in the manner described, the arms 31, 31a are lowered two board thicknesses plus the combined thickness of the kerfs cut by horizontal saws 41 and 42 and the operation is repeated, slides 32, 32a also having been appropriately adjusted inwardly on the arms. Thus, the log may be reduced to boards down to the level of log dogs 16 and 17, which maintain their grip on the remaining slab at the bottom of the log. The overhanging arms 31 and 31a supported in cantilever fashion from one end provide an open front allowing the logs to be rolled into the sawmill conveniently in lateral movement while the sawed lumber is discharged lengthwise from one end of the sawmill.

Unsalable boards containing rot or other defects in the log are left for disposal with the sawdust and only the saleable lumber needs to be transported out of the forest. As the logging operation progresses in a particular region, the sawmill is moved from place to place to minimize log haulage and accommodate lumber haulage facilities.

Having now described my invention and in what manner the same may be used, what I claim as new and desire to protect by Leters Patent is:

1. A sawmill comprising a base frame arranged to receive a log rolled over one side thereof into sawing position on the base frame, means for clamping the log on said base frame in said sawing position, a pair of uprights on the other side of said base frame, a pair of horizontal arms extending transversely over said base frame, vertically slidable cantilever supports for said arms on said uprights, a track bar extending longitudinally of said base frame mounted for transverse sliding movement along said arms, a saw carriage mounted for travel along said track bar, and horizontal and vertical circular saws on said carriage arranged to saw boards from the log when said carriage is traversed on said track bar.

2. A sawmill as defined in claim 1, including means on said carriage to remove the sawed boards by the return movement of said carriage following a sawing movement.

3. A sawmill as defined in claim 1, there being a pair of horizontal saws on a common shaft for sawing two boards at the same time.

4. A sawmill as defined in claim 1, including hydraulic means for traversing said carriage on said track bar and hydraulic motors on said carriage for driving said saws.

5. A sawmill as defined in claim 4, including flexible hoses connected with said motors for supplying hydraulic fluid, a boom having conduits connected with said hoses, means supplying hydraulic fluid to said boom conduits, and means pivotally supporting said boom for swinging movements along said track bar.

6. A sawmill as defined in claim 5, said supporting means comprising a beam supported by said arms and a vertical kingpin on said beam for said boom.

7. A sawmill as defined in claim 1, said log clamping means comprising fixed and movable log dogs on said base frame, and hydraulic means for actuating said movable dogs.

8. A sawmill as defined in claim 7, said movable dogs comprising slides, said hydraulic actuating means comprising cylinders arranged to reciprocate said slides, and pivotal dog plates on said slides arranged to be depressed when a log is rolled over them.

9. A sawmill as defined in claim 1, including hydraulic means for raising and lowering said arms and mechanical locking means for locking the arms in adjusted positions on said uprights.

10. A sawmill as defined in claim 9, said hydraulic means comprising cylinders in said uprights, a shaft mounted for rotation in bearings in said uprights, a sprocket wheel keyed to said shaft at each upright, chains connected to said arms trained over said sprocket wheels and down inside said uprights, and pistons in said cylinders arranged to move said chains.

11. A sawmill as defined in claim 1, including hydraulic means for moving said track bar along said arms and mechanical locking means for locking the track bar in adjusted positions on said arms.

12. A sawmill as defined in claim 11, including slides supporting said track bar on said arms, said hydraulic means comprising a cylinder in at least one of said arms, chains trained along said arms and connected to said slides, and a piston in said cylinder arranged to move said chains.

References Cited
UNITED STATES PATENTS

| | | | |
|---|---|---|---|
| 2,609,848 | 9/1952 | Schneider | 143—47 XR |
| 2,800,932 | 7/1957 | Scott | 143—38 |
| 3,017,911 | 1/1962 | Fulghum | 144—208 |
| 3,082,801 | 3/1963 | Dillingham | 144—208 |

WILLIAM W. DYER, Jr., *Primary Examiner.*

W. D. BRAY, *Assistant Examiner.*